US012586310B2

(12) United States Patent
Li et al.

(10) Patent No.:  US 12,586,310 B2
(45) Date of Patent:  Mar. 24, 2026

(54) APPARATUS AND METHOD WITH IMAGE PROCESSING

(71) Applicant: SAMSUNG ELECTRONICS CO., LTD., Suwon-si (KR)

(72) Inventors: Weiming Li, Beijing (CN); Namseop Kwon, Suwon-si (KR); Kyungboo Jung, Suwon-si (KR); Lin Ma, Beijing (CN); Myungjae Jeon, Suwon-si (KR); Qiang Wang, Beijing (CN); Young Hun Sung, Suwon-si (KR); Bao He, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 18/527,903

(22) Filed: Dec. 4, 2023

(65) Prior Publication Data

US 2024/0185519 A1      Jun. 6, 2024

(30) Foreign Application Priority Data

Dec. 2, 2022      (CN) .......................... 202211542904.8
Oct. 23, 2023      (KR) .......................... 10-2023-0142046

(51) Int. Cl.
| | |
|---|---|
| *G06T 17/00* | (2006.01) |
| *G06T 7/20* | (2017.01) |
| *G06T 7/70* | (2017.01) |
| *G06V 10/25* | (2022.01) |
| *G06V 10/44* | (2022.01) |
| *H04N 5/74* | (2006.01) |

(52) U.S. Cl.
CPC ................ *G06T 17/00* (2013.01); *G06T 7/20* (2013.01); *G06T 7/70* (2017.01); *G06V 10/25* (2022.01); *G06V 10/44* (2022.01); *H04N 5/74*

(2013.01); *G06T 2207/10024* (2013.01); *G06T 2207/10028* (2013.01); *G06T 2207/20084* (2013.01)

(58) Field of Classification Search
CPC .. G06T 17/00; G06T 7/70; G06T 7/20; G06T 2207/10024; G06T 2207/10028; G06T 2207/20084; G06V 10/25; G06V 10/44; H04N 5/74
USPC ........................................................ 345/419
See application file for complete search history.

(56) References Cited

U.S. PATENT DOCUMENTS

| | | |
|---|---|---|
| 11,132,586 B2 | 9/2021 | Tran et al. |
| 11,295,168 B2 | 4/2022 | Ye et al. |
| 2017/0374256 A1 | 12/2017 | Wagner |

(Continued)

FOREIGN PATENT DOCUMENTS

WO      WO 2022/187753 A1      9/2022

*Primary Examiner* — Hai Tao Sun
(74) *Attorney, Agent, or Firm* — NSIP Law

(57) ABSTRACT

A processor-implemented method includes obtaining a first motion matrix corresponding to an extended reality (XR) system and a second motion matrix based on a conversion coefficient from an XR system coordinate system into a rolling shutter (RS) camera coordinate system, and projecting an RS color image of a current frame onto a global shutter (GS) color image coordinate system based on the second motion matrix and generating a GS color image of the current frame, wherein the second motion matrix is a motion matrix of a timestamp of a depth image captured by a GS camera corresponding to a timestamp of a first scanline of an RS color image captured by the GS camera.

20 Claims, 7 Drawing Sheets

(56) References Cited

U.S. PATENT DOCUMENTS

| | | | | |
|---|---|---|---|---|
| 2020/0134389 | A1* | 4/2020 | Tran | H04N 23/90 |
| 2021/0392316 | A1* | 12/2021 | Bleyer | H04N 25/701 |

* cited by examiner

APPARATUS AND METHOD WITH IMAGE PROCESSING

CROSS-REFERENCE TO RELATED APPLICATIONS

This application claims the benefit under 35 USC § 119(a) of Chinese Patent Application No. 202211542904.8 filed on Dec. 2, 2022, in the China National Intellectual Property Administration, and Korean Patent Application No. 10-2023-0142046 filed on Oct. 23, 2023, in the Korean Intellectual Property Office, the entire disclosures of which are incorporated herein by reference for all purposes.

BACKGROUND

1. Field

The following description relates to an apparatus and method with image processing.

2. Description of Related Art

Augmented reality (AR) technology may provide a realistic information experience by adding virtual content to the actual scene in front of a user. In a three-dimensional (3D) space, an AR system may require high-precision real-time processing and understanding on the 3D status of surrounding objects and implement high-quality virtual reality fusion effects in front of the user.

Accurate and fast correction of a rolling shutter (RS) camera image is very important for AR interaction. The RS camera image correction is important to improve the user's experience of an AR scene. The RS camera image correction method according to the related art includes motion inversion estimation, which uses images of multiple frames for depth estimation or correction. However, the computation speed of the method according to the related art is too slow to use in a fast AR scene. Additionally, the method according to the related art assumes that the RS camera image correction is effective, but this assumption may damage the robustness of a downstream task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: obtaining a first motion matrix corresponding to an extended reality (XR) system and a second motion matrix based on a conversion coefficient from an XR system coordinate system into a rolling shutter (RS) camera coordinate system; and projecting an RS color image of a current frame onto a global shutter (GS) color image coordinate system based on the second motion matrix and generating a GS color image of the current frame, wherein the second motion matrix is a motion matrix of a timestamp of a depth image captured by a GS camera corresponding to a timestamp of a first scanline of an RS color image captured by a RS camera.

The method may include determining whether to perform the obtaining of the second motion matrix based on motion information related to an RS camera.

The determining of whether to perform the obtaining of the second motion matrix based on the motion information related to the RS camera may include: determining angular velocity and positional velocity of the RS camera based on pose information of an XR system for the RS color image of the current frame and pose information of an XR system for an RS color image of a previous frame; and performing either one of: determining to perform the obtaining of the second motion matrix in response to either one or both of the angular velocity being greater than a first threshold and the positional velocity being greater than a second threshold; and determining a first optical flow matrix between the RS color image of the current frame and the RS color image of the previous frame in response to the angular velocity not being greater than the first threshold and the positional velocity not being greater than the second threshold, determining to perform the obtaining of the second motion matrix in response to a maximum value of the first optical flow matrix being greater than a third threshold, and determining not to perform the obtaining of the second motion matrix in response to the maximum value of the first optical flow matrix not being greater than the third threshold.

The depth image captured by the GS camera corresponding to the timestamp of the first scanline may be a GS depth image with a timestamp closest to the timestamp of the first scanline.

The method may include: obtaining the first motion matrix and a third motion matrix based on the conversion coefficient from the XR system coordinate system into the RS camera coordinate system; projecting a GS depth image corresponding to a first scanline of the RS color image of the current frame onto the RS camera coordinate system using the third motion matrix based on the RS color image of the current frame and obtaining a GS depth image aligned with the RS color image of the current frame; obtaining a depth feature by inputting the aligned GS depth image to a first neural network; and inputting the depth feature and the GS color image of the current frame to a second neural network and obtaining a corrected GS color image of the current frame, wherein the third motion matrix is a motion matrix for the timestamp of the first scanline.

The method may include: determining a target area comprising a movable target in the GS color image of the current frame; and obtaining a corrected GS color image of the current frame by replacing a pixel of the target area of the GS color image of the current frame using a pixel corresponding to the target area in the RS color image of the current frame.

The method may include: obtaining the first motion matrix and a third motion matrix based on the conversion coefficient from the XR system coordinate system into the RS camera coordinate system; projecting a GS depth image corresponding to a first scanline of the RS color image of the current frame onto the RS camera coordinate system using the third motion matrix based on the RS color image of the current frame and obtaining a GS depth image aligned with the RS color image of the current frame; obtaining a depth feature by inputting the aligned GS depth image to a first neural network; and inputting the depth feature and the corrected GS color image of the current frame to a second neural network and obtaining an improved and corrected GS color image of the current frame, wherein the third motion matrix is a motion matrix for the timestamp of the first scanline.

The method may include: in response to determining not to perform the obtaining of the second motion matrix, obtaining the first motion matrix and a third motion matrix based on the conversion coefficient from the XR system coordinate system into the RS camera coordinate system; projecting a GS depth image corresponding to a first scanline of the RS color image of the current frame onto the RS camera coordinate system using the third motion matrix based on the RS color image of the current frame and obtaining a GS depth image aligned with the RS color image of the current frame; obtaining a depth feature by inputting the aligned GS depth image to a first neural network; and inputting the depth feature and a RS color image of the current frame to a second neural network and obtaining the GS color image of the current frame, wherein the third motion matrix is a motion matrix for the timestamp of the first scanline.

The projecting of the GS depth image corresponding to the first scanline of the RS color image of the current frame onto the RS camera coordinate system may include: projecting a plurality of second scanlines of the GS depth image corresponding to the first scanline onto a GS camera coordinate system for the first scanline of the RS color image of the current frame; and projecting the plurality of second scanlines onto the RS camera coordinate system based on the third motion matrix and obtaining a second scanline aligned with the first scanline.

The plurality of second scanlines may include a second scanline corresponding to the first scanline of the RS color image of the current frame and a second scanline located in a predetermined range of the corresponding second scanline.

The first neural network may be a convolutional neural network (CNN) and/or the second neural network is a U-network (UNET) neural network.

The projecting of the RS color image of the current frame onto the GS color image coordinate system may include: projecting the first scanline onto a GS camera coordinate system for a first scanline of the RS color image of the current frame; and projecting the first scanline onto the GS camera coordinate system and projecting the first scanline onto the GS color image coordinate system based on the second motion matrix and obtaining the GS color image of the current frame.

The determining of the target area comprising the movable target in the GS color image of the current frame may include: projecting a GS depth image corresponding to a first scanline of the RS color image of the current frame onto the RS camera coordinate system based on an RS color image of a previous frame using a third motion matrix and obtaining a GS depth image aligned with the RS color image of the previous frame; determining a second optical flow matrix based on a GS depth image aligned with the RS color image of the current frame and a GS depth image aligned with the RS color image of the previous frame; and determining the target area in the GS color image of the current frame based on a first optical flow matrix and the second optical flow matrix between the RS color image of the current frame and the RS color image of the previous frame, wherein the third motion matrix is obtained based on the first motion matrix and a conversion coefficient from the XR system coordinate system into the RS camera coordinate system, and wherein the GS depth image aligned with the RS color image of the current frame is obtained by projecting the GS depth image corresponding to the first scanline of the RS color image of the current frame onto the RS camera coordinate system based on the RS color image of the current frame using the third motion matrix.

The obtaining of the corrected GS color image of the current frame by replacing the pixel of the target area of the GS color image of the current frame using the pixel corresponding to the target area in the RS color image of the current frame may include: determining the pixel corresponding to the target area among the RS color image of the current frame and the GS color image of the current frame based on the first optical flow matrix; and replacing the pixel of the target area of the GS color image of the current frame with the corresponding pixel.

In one or more general aspects, an electronic device includes: one or more processors configured to: obtain a first motion matrix corresponding to an extended reality (XR) system and a second motion matrix based on a conversion coefficient from an XR system coordinate system into a rolling shutter (RS) camera coordinate system; and project an RS color image of a current frame onto a global shutter (GS) color image coordinate system based on the second motion matrix and generate a GS color image of the current frame, wherein the second motion matrix is a motion matrix of a timestamp of a depth image captured by a GS camera corresponding to a timestamp of a first scanline of an RS color image captured by a RS camera.

The one or more processors may be configured to determine whether to perform the obtaining of the second motion matrix based on motion information related to an RS camera.

For the determining of whether to perform the obtaining of the second motion matrix based on the motion information related to the RS camera, the one or more processors may be configured to: determine angular velocity and positional velocity of the RS camera based on pose information of an XR system for the RS color image of the current frame and pose information of an XR system for an RS color image of a previous frame; and perform either one of determining to perform the obtaining of the second motion matrix in response to the angular velocity being greater than a first threshold or the positional velocity being greater than a second threshold; and determining a first optical flow matrix between the RS color image of the current frame and the RS color image of the previous frame in response to the angular velocity not being greater than the first threshold and the positional velocity not being greater than the second threshold, determine to perform the obtaining of the second motion matrix in response to a maximum value of the first optical flow matrix being greater than a third threshold, and determine not to perform the obtaining of the second motion matrix in response the maximum value of the first optical flow matrix not being greater than the third threshold.

The depth image captured by the GS camera corresponding to the timestamp of the first scanline may be a GS depth image with a timestamp closest to the timestamp of the first scanline.

The one or more processors may be configured to: obtain the first motion matrix and a third motion matrix based on the conversion coefficient from the XR system coordinate system into the RS camera coordinate system; project a GS depth image corresponding to a first scanline of the RS color image of the current frame onto the RS camera coordinate system using the third motion matrix based on the RS color image of the current frame and obtain a GS depth image aligned with the RS color image of the current frame; input the aligned GS depth image to a first neural network and obtain a depth feature; and input the depth feature and the GS color image of the current frame to a second neural network and obtain a corrected GS color image of the current frame, wherein the third motion matrix is a motion matrix for the timestamp of the first scanline.

The one or more processors may be configured to: determine a target area comprising a movable target in the GS color image of the current frame; and obtain a corrected GS color image of the current frame by replacing a pixel of the target area of the GS color image of the current frame using a pixel corresponding to the target area in the RS color image of the current frame.

Other features and aspects will be apparent from the following detailed description, the drawings, and the claims.

Figure 1:
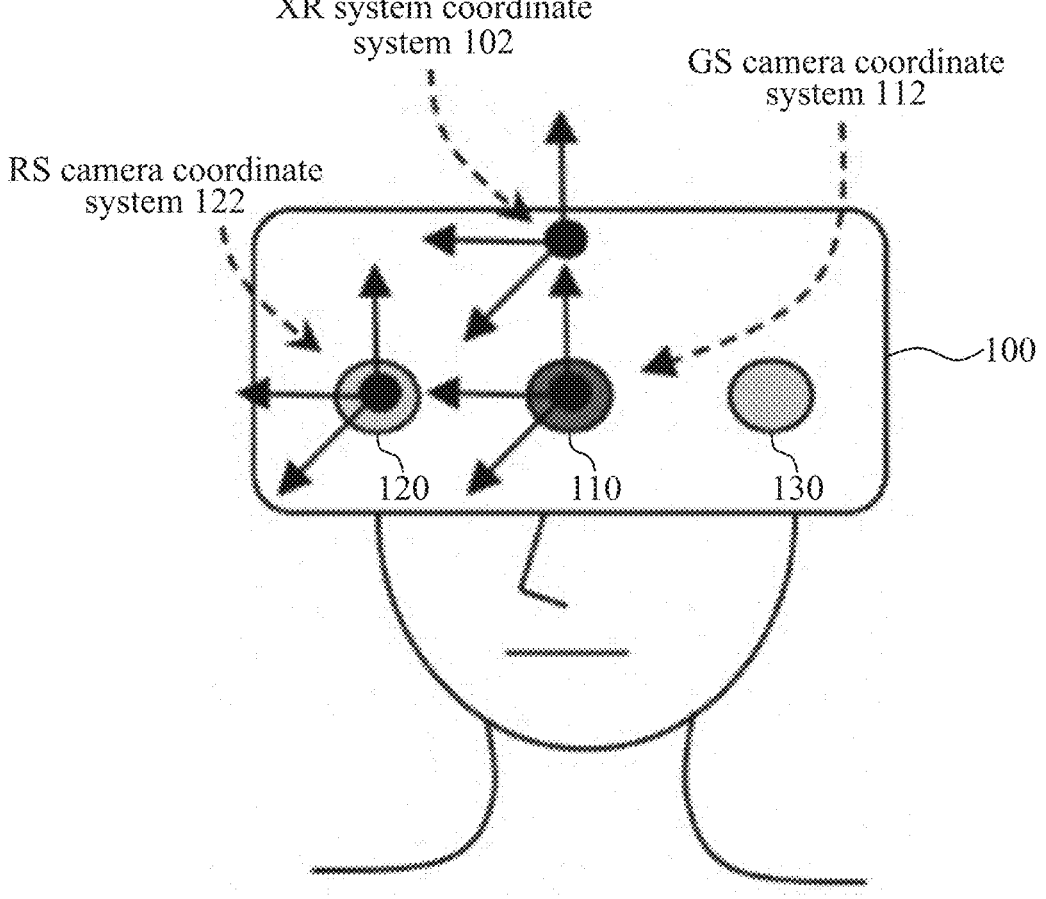
FIG. 1 illustrates an example of a coordinate system in an extended reality (XR) system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which this disclosure pertains and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

When describing the examples with reference to the accompanying drawings, like reference numerals refer to like components and a repeated description related thereto will be omitted. In the description of examples, detailed description of well-known related structures or functions will be omitted when it is deemed that such description will cause ambiguous interpretation of the present disclosure.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The phrases "at least one of A, B, and C," "at least one of A, B, or C," and the like are intended to have disjunctive meanings, and these phrases "at least one of A, B, and C," "at least one of A, B, or C," and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The same name may be used to describe an element included in the examples described above and an element having a common function. Unless otherwise mentioned, the descriptions on the examples may be applicable to the following examples and thus, duplicated descriptions will be omitted for conciseness.

First, the terms and/or symbols of non-limiting examples of the present disclosure are described as follows.

1. A rolling shutter (RS) camera.

A color sensor of the RS camera may capture a color image using an RS method.

The color sensor may work with a time period t_cp ("cp" is shorter than a depth time period.)

A first color image of a video may be captured at timestamp t_c(0). In the RS color camera, t_c(0) is a timestamp of a first scanline of an image and the RS color image is represented as I_c(0).

An r-th scanline of I_c(0) may be captured at timestamp $t\_c(0)\_r=t\_c(0)+r\times t\_row$, where r denotes a row index and t_row denotes an exposure time of the color sensor divided by the scanline of the color image.

The r-th scanline of a j-th color image may be captured at time $t\_c(j)\_r=t\_c(0)+j\times t\_cp+r\times t\_row$.

The first scanline may represent the color image captured at timestamp t_c(j) as I_c(j).

The scanline of row r in the color image I_c(j) may be represented as I_c(j)_r.

2. A global shutter (GS) camera.

A depth sensor of the GS camera may capture a depth image using a GS method.

Assume the depth sensor works with a time period t_dp ("dp" is shorter than a depth time period.)

A starting depth image may be captured at timestamp t_d(0).

An i-th depth image may be captured at timestamp $t\_d(i)=t\_d(0)+i\times t\_dp$.

The depth image captured at timestamp t_d(i) may be represented as D_d(i).

3. Pose information and a parameter of an extended reality (XR) system.

In three-dimensions (3D), pose transformation may be described by a 3×3 rotation matrix R and a 3×1 transformation matrix vector T. 6 degrees of freedom (DOF) pose transformation may be expressed as a 4×4 matrix P=[RT; 0 1].

A first motion matrix corresponding to the XR system at time t may be expressed as P_S(t), that is, an XR system coordinate system may be transformed from "0" to an N×N matrix at timestamp t (where N is a positive integer such as a 4×4 matrix), and P_S(t) may be obtained by methods such as visual inertial measurement (VIO), simultaneous localization and mapping (SLAM), and the like.

4. An external parameter of the XR system (an example of which is described with reference to FIG. 1).

FIG. 1 illustrates an example of a coordinate system in an XR system.

M_CS: a conversion coefficient from an XR system coordinate system 102 of an XR system 100 into an RS camera coordinate system 122 of an RS camera 120 or an RS camera 130, for example, may be an N×N matrix (where N is a positive integer such as a 4×4 matrix.)

M_SD: a conversion coefficient from a GS camera coordinate system 112 of a GS camera 110 into the XR system coordinate system 102, for example, may be an N×N matrix (where N is a positive integer such as a 4×4 matrix.)

5. An internal parameter of the XR system 100 (described with reference to FIG. 1).

Kc: an internal parameter of the RS camera 120, such as focal length, resolution, etc.

Using a scanline of a color image as a certain camera, a third motion matrix P_c(j)_r of the certain camera may be expressed as $P\_c(j)\_r=M\_CS\times P\_S(t\_c(j)\_r)$, where t_c(j)_r represents the timestamp of I_c(j)_r.

Figure 2:
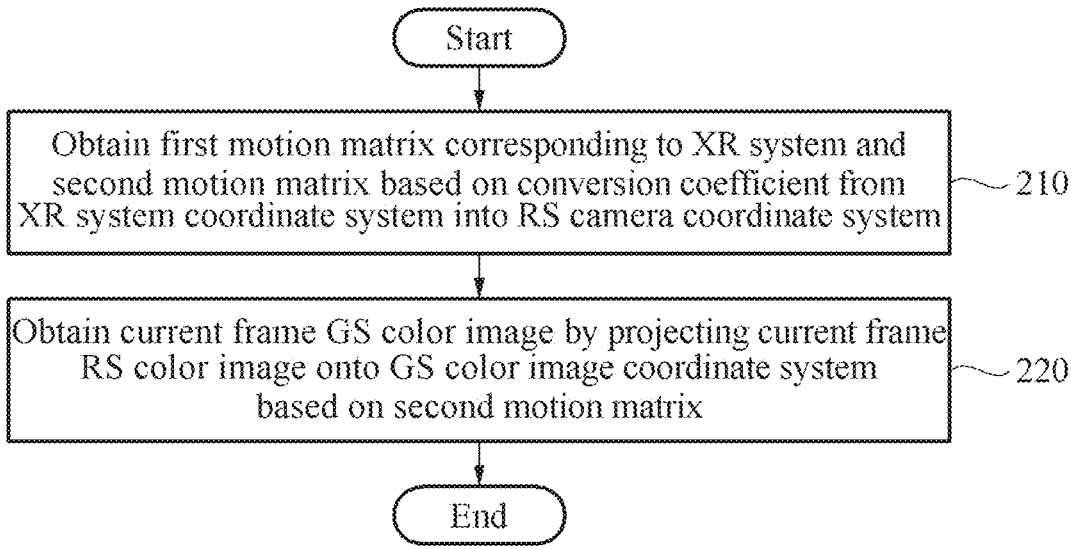
FIG. 2 illustrates an example of a schematic process of an image processing method.

FIG. 2 illustrates an example of a schematic process of an image processing method. While the operations of FIG. 2 may be performed in the shown order and manner, the order of one or more of the operations may be changed, one or more of the operations may be omitted, and/or one or more of the operations may be performed in parallel or simultaneously, without departing from the spirit and scope of the shown example.

Here, an XR system may include an RS camera and a GS camera.

Referring to FIG. 2, in operation 210, an image processing method may obtain a first motion matrix corresponding to the XR system and a second motion matrix based on a conversion coefficient from an XR system coordinate system into an RS camera coordinate system. Here, the second motion matrix may be a motion matrix for a timestamp of a GS depth image captured by the GS camera corresponding to a timestamp of a first scanline of an RS color image captured by the RS camera. Here, it should be noted that the first scanline of the RS color image represents an arbitrary scanline of the RS color image and does not refer to a certain first scanline. Additionally, the color image may be, for example, a red, green, and blue (RGB) image, but examples are not limited thereto.

Here, the GS depth image corresponding to the timestamp of the scanline of the RS color image may be a GS depth image with a timestamp closest to the timestamp of the first scanline. For example, for the first scanline of timestamp t_c(j)_r, the GS depth image closest to the timestamp may be found in a predetermined range near t_c(j)_r according to the timestamp. The timestamp D_d(i) of the GS depth image may be expressed as t_d(i), and i may be determined through Equation 1 below, for example. For example, the number of frames of the GS depth image may be determined according to the number of frames of the GS depth image, so the GS depth image may be determined.

$$i=\text{argmin}\_k\{\text{abs}(t\_c(j)\_r-t\_d(k))\} \qquad \text{Equation 1}$$

In Equation 1, abs takes an absolute value and argmin_k denotes the minimum value among k values in a square bracket.

For example, when the first scanline is at 1 second of the timestamp, the GS depth image closest to the timestamp may be obtained by substituting k GS depth images in 1 second before and after the 1 second of the timestamp into Equation 1.

In addition, the image processing method may determine whether to perform operation 210 of obtaining the second motion matrix based on motion information related to the RS camera before operation 210.

An example of the determining of whether to perform the second motion matrix is described in detail below with reference to FIG. 3.

Figure 3:
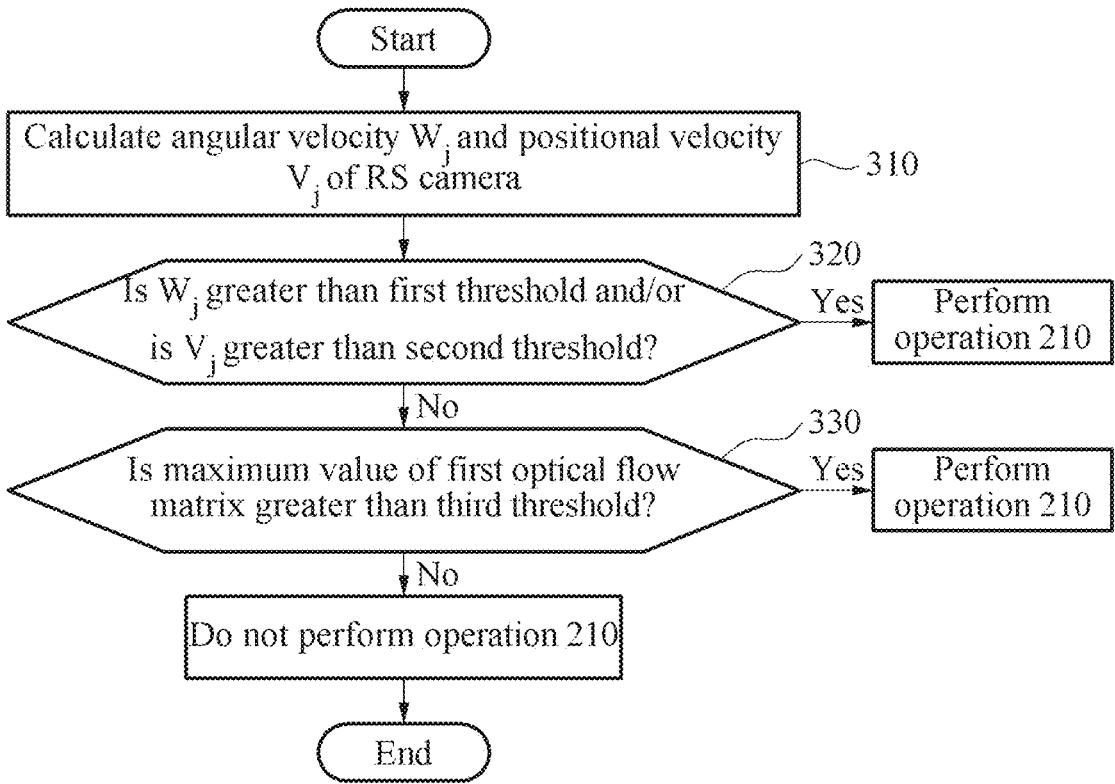
FIG. 3 illustrates an example of a process of determining whether to perform obtaining a second motion matrix in an image processing method.

FIG. 3 illustrates an example of a process of determining whether to perform obtaining a second motion matrix in an image processing method. While the operations of FIG. 3 may be performed in the shown order and manner, the order of one or more of the operations may be changed, one or more of the operations may be omitted, and/or one or more of the operations may be performed in parallel or simultaneously, without departing from the spirit and scope of the shown example.

Referring to FIG. 3, in operation 310, the image processing method may calculate (e.g., determine) angular velocity W_j and positional velocity V_j of the RS camera using XR system pose information of a current frame RS color image and XR system pose information of a previous frame RS color image. For example, the image processing method may perform calculation based on the XR system pose information based on a timestamp t_c(j) of the current frame RS color image and the XR system pose information of a timestamp t_c(j−1) of the previous frame RS color image. Here, the current frame RS color image may represent the RS color image of the current frame and the previous frame RS color image may represent the RS color image of the previous frame.

In addition, in operation 320, the image processing method may determine whether the angular velocity is greater than a first threshold and/or the positional velocity is greater than a second threshold.

As a result of the determination in operation 320, when the angular velocity is greater than the first threshold and/or the positional velocity is greater than the second threshold, the image processing method may determine to perform operation 210. Here, a norm $\|W_j\|$ of the angular velocity and a norm $\|V_j\|$ of the positional velocity, for example, may be used to compare with a threshold, but examples are not limited thereto. Additionally, the first threshold and the second threshold may be, for example, empirical values, and for example, the first threshold may be 5 degrees and the second threshold may be 10 pixels/millisecond, but examples are not limited thereto.

As a result of the determination in operation 320, when the angular velocity is less than or equal to the first threshold and the positional velocity is less than or equal to the second threshold, the image processing method may calculate a first optical flow matrix between the current frame RS color image and the previous frame RS color image (e.g., optical flow, which is a matrix, such that the optical flow may be expressed as an optical flow matrix to indicate an image change) and determine whether a maximum value of the first optical flow matrix is greater than a third threshold in operation 330.

As a result of the determination in operation 330, when the maximum value of the first optical flow matrix is greater than the third threshold, the image processing method may determine to perform operation 210.

As a result of the determination in operation 330, when the maximum value of the first optical flow matrix is less than or equal to the third threshold, the image processing method may determine not to perform operation 210. Here, a norm of the maximum value of the first optical flow matrix is, for example, $\text{Max}\_(u,v)\{\|F\_c(j)(u,v)\|\}$ that may be compared with the threshold value, but examples are not limited thereto. Here, $F\_c(j)(u,v)$ may represent the first optical flow matrix between two consecutive RS color images and $(u,v)$ may represent an image pixel position. Additionally, the third threshold may be, for example, an empirical value. For example, the third threshold may be 5 pixels, but examples are not limited thereto.

However, it should be noted that when the obtaining of the second motion matrix is not determined based on the motion information related to the RS camera described above, the image processing method may perform image processing on each frame GS color image.

Returning to the description of FIG. 2, in operation 220, the image processing method may obtain the current frame GS color image by projecting the current frame RS color image onto the GS color image coordinate system based on the second motion matrix.

For example, the projecting of the current frame RS color image onto the GS color image coordinate system may include, for the first scanline of the current frame RS color image, projecting the first scanline onto the GS camera coordinate system, and projecting the first scanline onto the GS camera coordinate system, and projecting the first scanline onto the GS color image coordinate system based on the second motion matrix and obtaining the current frame GS color image.

For example, the image processing method, may select a timestamp to define the GS color image coordinate system to obtain the GS color image, but examples are not limited thereto. For this, the image processing method may select timestamp t_d(i) of the GS depth image obtained in operation 210. In addition, the image processing method may define the GS color image coordinate system using a second motion matrix $M\_CS \times P\_S(t\_d(i))$. Here, $M\_CS$ may be obtained by the XR system pose information and external parameter. $P\_S(t)$ may represent the first motion matrix for transformation from "0" to timestamp t in the XR system coordinate system, which may be an N×N (where N is a positive integer) matrix (e.g., a 4×4 matrix).

Next, the image processing method may project each pixel of each scanline $I\_c(j)\_r$ onto a 3D point $Xp\_c(j)\_r$ using a depth, for each scanline $I\_c(j)\_r$ of the RS color image and a scanline $D\_c(j)\_r$ of the corresponding GS depth image. Then, the image processing method may project the pixel projected onto the 3D point $Xp\_c(j)\_r$ onto the GS color image coordinate system based on Equation 2 below, for example, and GS color image I′ _d(i) may be obtained in response to completing the projection of each scanline $I\_c(j)\_r$ of the RS color image.

$$\text{Here, } xp\_d(i)\_r = Kc \times M\_CS \times P\_S(t\_d(k)) \times \text{inv}(P\_S(t\_c(j)\_r)) \times \text{inv}(M\_CS) \times Xp\_c(j)\_r \qquad \text{Equation 2}$$

In Equation 2, $xp\_d(i)\_r$ denotes a pixel location projected onto the GS color image, $Kc$ denotes an internal parameter of the RS camera, and inv denotes an inversion.

In addition, as an optional operation in the image processing method, in response to operation 220, a target area including a movable target may be determined in the current frame GS color image. Here, the movable target may refer to a target that may be in a moving state in an image. For example, when a captured image includes the ground and a moving car, the ground, for example, may not belong to the target area including the movable target and the moving car may belong to the target area including the movable target, but examples are not limited thereto. Here, several methods may be used to determine the target area of the current frame GS color image.

The determining of the target area of the current frame GS color image may include, for example, projecting the GS depth image corresponding to each first scanline of the current frame RS color image onto the RS camera coordinate system based on the previous frame RS color image using the third motion matrix and obtaining a GS depth image aligned with the previous frame RS color image, determining a second optical flow matrix based on the GS depth image aligned with the current frame RS color image and the GS depth image aligned with the previous frame RS color image, and determining the target area in the current frame GS color image based on the first optical flow matrix and the second optical flow matrix between the current frame RS color image and the previous frame RS color image, but examples are not limited thereto. Here, the third motion matrix may be obtained based on the first motion matrix and a conversion coefficient from the XR system coordinate system into the RS camera coordinate system. In addition, the GS depth image aligned with the RS color image of the current frame may be obtained by projecting the GS depth image corresponding to each first scanline of the current frame RS color image onto the RS camera coordinate system based on the current frame RS color image using the third motion matrix.

The image processing method may obtain a corrected current frame GS color image by replacing a pixel in the target area of the current frame GS color image with a pixel corresponding to a target area in the current frame RS color image using a pixel corresponding to the target area of the RS color image of the current frame. Here, the corrected current frame GS color image may represent the corrected GS color image of the current frame.

For example, the replacing of the pixel corresponding to the target area of the current frame GS color image with a pixel corresponding to a target area in the current frame RS color image using the pixel corresponding to the target area of the current frame RS color image may include determining a pixel corresponding to the target area among the current frame RS color image and the current frame GS color image based on the first optical flow matrix and replacing a pixel corresponding to the target area of the current frame GS color image with a pixel corresponding to a target area in the current frame RS color image using the determined pixel.

For example, an image correction method may perform the following operation to replace a pixel corresponding to a target area of the current frame GS color image using a pixel corresponding to the target area of the current frame RS color image.

First, the image correction method may project each GS depth image pixel xp_d(i) of the GS depth image D_d(i) onto the RS color image I_c(j). For example, the image correction method may obtain the current frame RS color image and the RS color image pixel location xp_c(j) projected therethrough. For example, the image correction method may obtain xp_d(i) by projecting a depth pixel (i.e., a GS depth image pixel) onto a depth camera coordinate system, and then align the projected depth pixel with the RS color image I_c(j) by projecting xp_d(i) onto the RS color image I_c(j) using the XR system pose information and external parameter. An example of this operation is described in detail below with reference to FIG. 4.

Subsequently, the image correction method may similarly project each GS depth image pixel xp_d(i) of the GS depth image D_d(i) onto the RS color image I_c(j−1). For example, the image correction method may obtain the RS color image of the previous frame and the RS color image pixel location xp_c(j−1) projected therethrough. In addition, the image correction method may calculate the second optical flow matrix F'_c(j) based on xp_c(j) and xp_c(j−1). Subsequently, the image correction method may compare the second optical flow matrix F'_c(j) with the first optical flow matrix F_c(j) obtained during the task corresponding to FIG. 3. For example, the image correction method may obtain an optical flow motion vector through the second optical flow matrix F'_c(j) and the first optical flow matrix F_c(j) and use an area with a different optical flow motion vector as a dynamic area (i.e., a target area). The image correction method may replace the obtained dynamic area with the corresponding area of I'_d(i) as a local image block of I_c(j) based on the first optical flow matrix F_c(j). Specifically, based on Equation 3 below, for example, the pixel [u', v'] of I'_d(i) may be replaced with the pixel [u, v] of I_c(j).

$$u' = u + F\_c(j)[u,v](u) \times td$$

$$v' = v + F\_c(j)[u,v](v) \times td \qquad \text{Equation 3}$$

Here, F_c(j)[u,v](u) denotes the second optical flow matrix in the u direction, F_c(j)[u,v](v) denotes the first optical flow matrix in the v direction, and td may be obtained from [t_c(j)−t_d(j)]/[t_c(j)−t_c(j−1)].

The image correction method, for example, may further improve the GS color image I'_d(i) in response to correction of the target area including the movable target through a neural network in response to correction of the target area including the movable target, but examples are not limited thereto.

The image processing method may further include obtaining the first motion matrix and the third motion matrix based on the conversion coefficient from the XR system coordinate system into the RS camera coordinate system, projecting the GS depth image corresponding to each first scanline of the current frame RS color image onto the RS camera coordinate system using the third motion matrix based on the current frame RS color image and obtaining the GS depth image aligned with the current frame RS color image, inputting the aligned GS depth image to a first neural network and obtaining a depth feature, and inputting the depth feature and the current frame GS color image to a second neural network and obtaining the corrected current frame GS color image. Here, the third motion matrix may be a motion matrix for the timestamp of the first scanline.

Here, the first neural network may be, for example, a convolutional neural network (CNN) and/or the second neural network may be, for example, a U-network (UNET) neural network, but examples are not limited thereto. Hereinafter, an example of the further improving of the GS color image in response to correction of the target area through a neural network is described in detail below with reference to FIG. 5.

Here, the projecting of the GS depth image corresponding to each first scanline of the current frame RS color image onto the RS camera coordinate system may include, for each first scanline of the current frame RS color image, projecting a plurality of second scanlines of the GS depth image corresponding to the first scanline onto the GS camera coordinate system and projecting the plurality of second scanlines onto the RS camera coordinate system based on the third motion matrix and obtaining a second scanline aligned with the first scanline. Here, the plurality of second scanlines may include, for example, a second scanline corresponding to the first scanline of the current frame RS color image and a second scanline where the corresponding second scanline is located in a predetermined range, but examples are not limited thereto. It should be noted that the second scanline represents an arbitrary scanline of the GS depth image and does not refer to a certain second scanline. Hereinafter, an example of the projecting of the GS depth image corresponding to each first scanline of the current frame RS color image onto the RS camera coordinate system is described in more detail below with reference to FIG. 4.

For example, the image processing method may further include obtaining the first motion matrix and the third motion matrix based on the conversion coefficient from the XR system coordinate system into the RS camera coordinate system, projecting the GS depth image corresponding to each first scanline of the current frame RS color image onto the RS camera coordinate system using the third motion matrix based on the current frame RS color image and obtaining the GS depth image aligned with the current frame RS color image, inputting the aligned GS depth image to the first neural network and obtaining the depth feature, and inputting the depth feature and the current frame GS color image to the second neural network and obtaining the corrected current frame GS color image. Here, the third motion matrix may be a motion matrix for the timestamp of the first scanline.

For example, when it is determined not to perform the obtaining of the second motion matrix shown in FIG. 3, the image processing method may further include obtaining the first motion matrix and the third motion matrix based on the conversion coefficient from the XR system coordinate system into the RS camera coordinate system, projecting the GS depth image corresponding to each first scanline of the current frame RS color image onto the RS camera coordinate system using the third motion matrix based on the current frame RS color image and obtaining the GS depth image aligned with the current frame RS color image, inputting the aligned GS depth image to the first neural network and obtaining the depth feature, and inputting the depth feature and the current frame RS color image to the second neural network and obtaining the current frame GS color image. Here, the third motion matrix may be a motion matrix for the timestamp of the first scanline.

For example, the differences between the first three tasks are as follows. The first task may be inputting the depth feature and the corrected current frame GS color image to the second neural network and obtaining an improved and corrected current frame GS color image by improving the corrected current frame GS color image. The second task may be inputting the depth feature and an uncorrected current frame GS color image to the second neural network and obtaining the corrected current frame GS color image. The third task may be directly inputting the depth feature and an original current frame RS color image to the second neural network and obtaining the current frame GS color image. All three obtained GS color images may be used as final outputs. An example of improving the RS color image or the GS color image through the neural network is described in more detail below with reference to FIG. 5.

Figure 4:
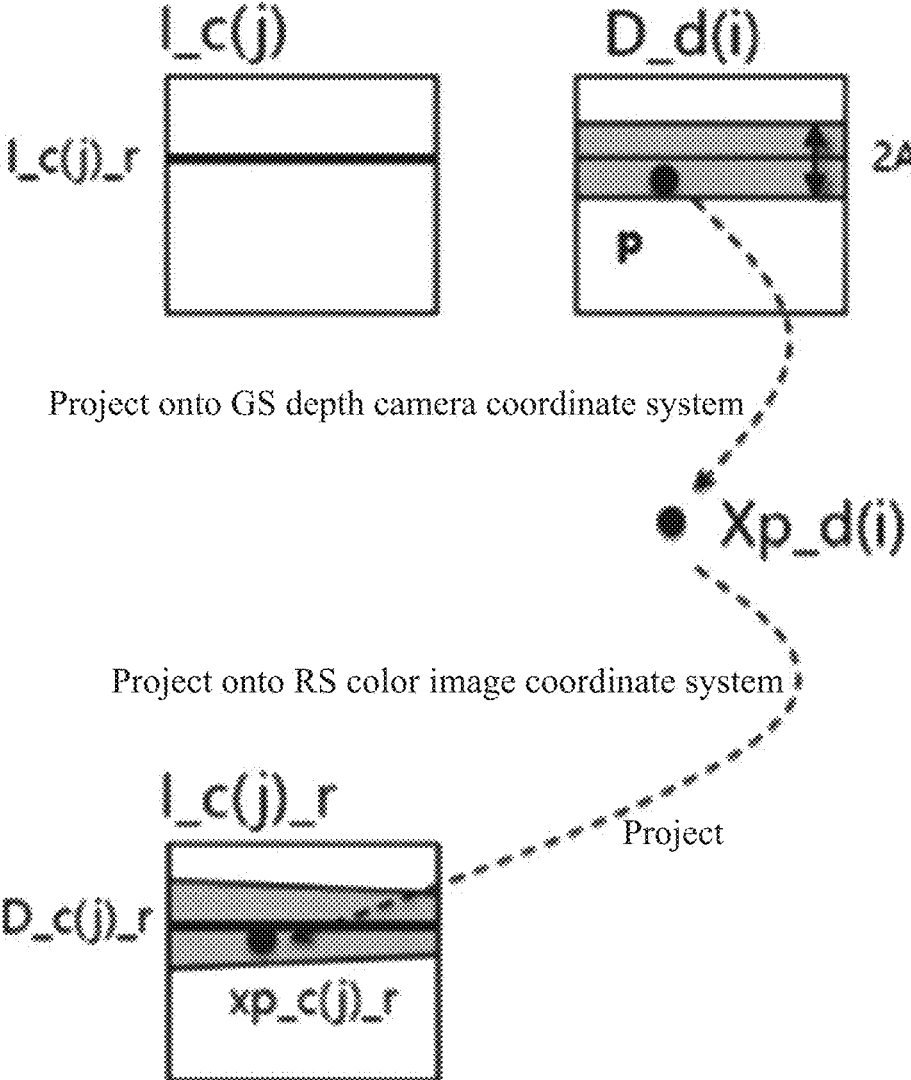
FIG. 4 illustrates an example of projecting a global shutter (GS) depth image corresponding to each first scanline of a rolling shutter (RS) color image of a current frame onto an RS camera coordinate system.

FIG. 4 illustrates an example of projecting a GS depth image corresponding to each first scanline of an RS color image of a current frame onto an RS camera coordinate system.

Referring to FIG. 4, in the RS color image (I_c(j)), the first scanline of row r may be I_c(j)_r, which may be regarded as a line camera with its own motion. As shown in Equation 4 below, for example, the third motion matrix P_c(j)_r may be represented using the conversion coefficient M_CS (which may be an N×N matrix such as a 4×4 matrix, where N is a positive integer, and M_CS may be obtained from the pose information of the XR system and external parameter) from the XR system coordinate system into the RS camera coordinate system and the first motion matrix P_S(t) (which may be an N×N matrix such as a 4×4 matrix, where N is a positive integer) corresponding to the XR system.

$$P\_c(j)\_r = M\_CS \times P\_S(t\_c(j)\_r) \qquad \text{Equation 4}$$

Here, t_c(j)_r denotes the timestamp of the r-th first scanline I_c(j)_r.

Through the tasks of FIG. 4, the GS depth image D_d(i) corresponding to the first scanline of the RS color image I_c(j) may be aligned with the first scanline I_c(j)_r through depth-color warping. The image processing method may only use, for example, to reduce the computational load, the second scanline of row r corresponding to the first scanline of the GS depth image and the RS color image of the current frame for the first scanline of each RS color image and the second scanline (e.g., {D_d(i)_(r−A) . . . , D_d(i)_(r+A)}) where the corresponding second scanline and location are in a predetermined range 2A, but examples are not limited thereto. The value of A may be, for example, 5 pixels, but examples are not limited thereto.

As shown in FIG. 4, each depth pixel in the predetermined range 2A may be projected onto the GS depth camera coordinate system and the 3D point Xp_d(i) may be obtained. Here, D_d(i) may be defined in the GS depth camera coordinate system at time t_d(i). Then, Xp_d(i) may be made to match with a world coordinate system through Inv(P_S(t_d(i))), and then based on Equation 5 below, for example, Xp_d(i) may move to time t_c(j)_r using the third motion matrix P_c(j)_r (which may be obtained through Equation 4.)

$$xp\_c(j)\_r = Kc \times M\_CS \times P\_S(t\_c(j)\_r) \times \text{Inv}(P\_S(t\_d \\ (i))) \times M\_SD \times Xp\_d(i) \qquad \text{Equation 5}$$

Here, xp_c(j)_r denotes the second scanline of the projected GS depth image, Kc denotes an internal parameter of the RS camera, and inv denotes an inversion.

The image processing method may select, through Equation 5, the second scanline of row r corresponding to the first scanline of the current frame RS color image and the second scanline D_c(j)_r of the GS depth image aligned with I_c(j)_r in the second scanline of the aligned GS depth image obtained at the second scanline location corresponding to the predetermined range 2A. In addition, the image processing method may obtain the GS depth image aligned with the RS color image I_c(j) in response to performing the tasks on each scanline of the RS color image I_c(j).

In the image processing method, the GS depth image may lack pixels after the tasks due to the distinction of viewpoint differences and hole filling may be performed through a method such as image expansion, so further description thereof is not repeated herein.

Figure 5:
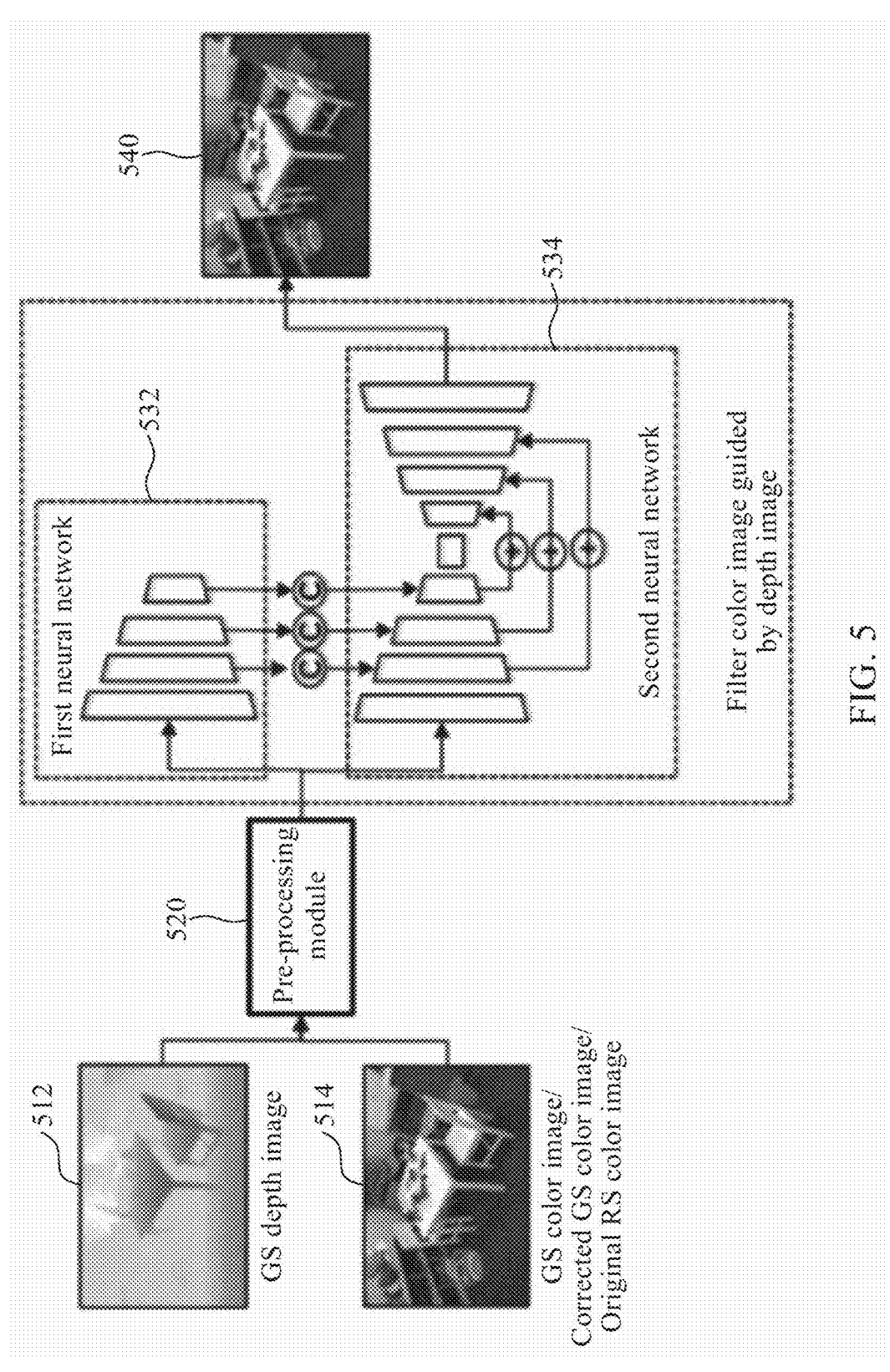
FIG. 5 illustrates an example of improving an RS color image or a GS color image through a neural network.

FIG. 5 illustrates an example of improving an RS color image or a GS color image through a neural network.

Referring to FIG. 5, an input may be a GS color image 514 without target area correction, the GS color image 514 after target area correction (when determining correction on the current frame RS color image in FIG. 3), or the original RS color image 514 (when determining no correction on the current frame RS color image in FIG. 3) and a GS depth image 512. Since there are still residual errors in the GS color image 514 after target area correction, the present disclosure may further improve the quality of a color image by further improving the color image through first and second neural networks 532 and 534.

As shown in FIG. 5, a model may include the first neural network 532 for extracting a depth feature and the second neural network 534 for aligning multi-scale color-depth. The first neural network 532 may be, for example, a CNN and the second neural network 534 may be, for example, a UNET neural network, but examples are not limited thereto. Additionally, a pre-processing module 520 may be added prior to the first and second neural networks 532 and 534.

When training the model, the pre-processing module 520 may perform normalization on color and depth images and the normalized depth image may be supplied to the first neural network 532 for extracting a multi-scale depth feature. The normalized color image may be supplied to the second neural network 534. When the depth image is captured using the GS camera, a depth layer with relatively low resolution (rough structure) may be connected to the color feature and a guidance on a GS scene structure may be provided. Then, a decoder network (i.e., the second half of the second neural network 534) may be used to reconstruct an improved color image. The skip connection may be added to improve function information (i.e., as shown as "+" in the drawing, a second layer of the second neural network 534 may be input to the second layer from the back of the second neural network 534 with a feature C output from the second layer of the first neural network 532). For training, the objective loss may be L1 loss.

When inferring the model, the pre-processing module 520 may perform normalization on color and depth images and then supply the color and depth images to the first neural network 532 and the second neural network 534 to obtain an improved color image. The improved color image may be output with the depth image and form an aligned color depth image 540.

Figure 6:
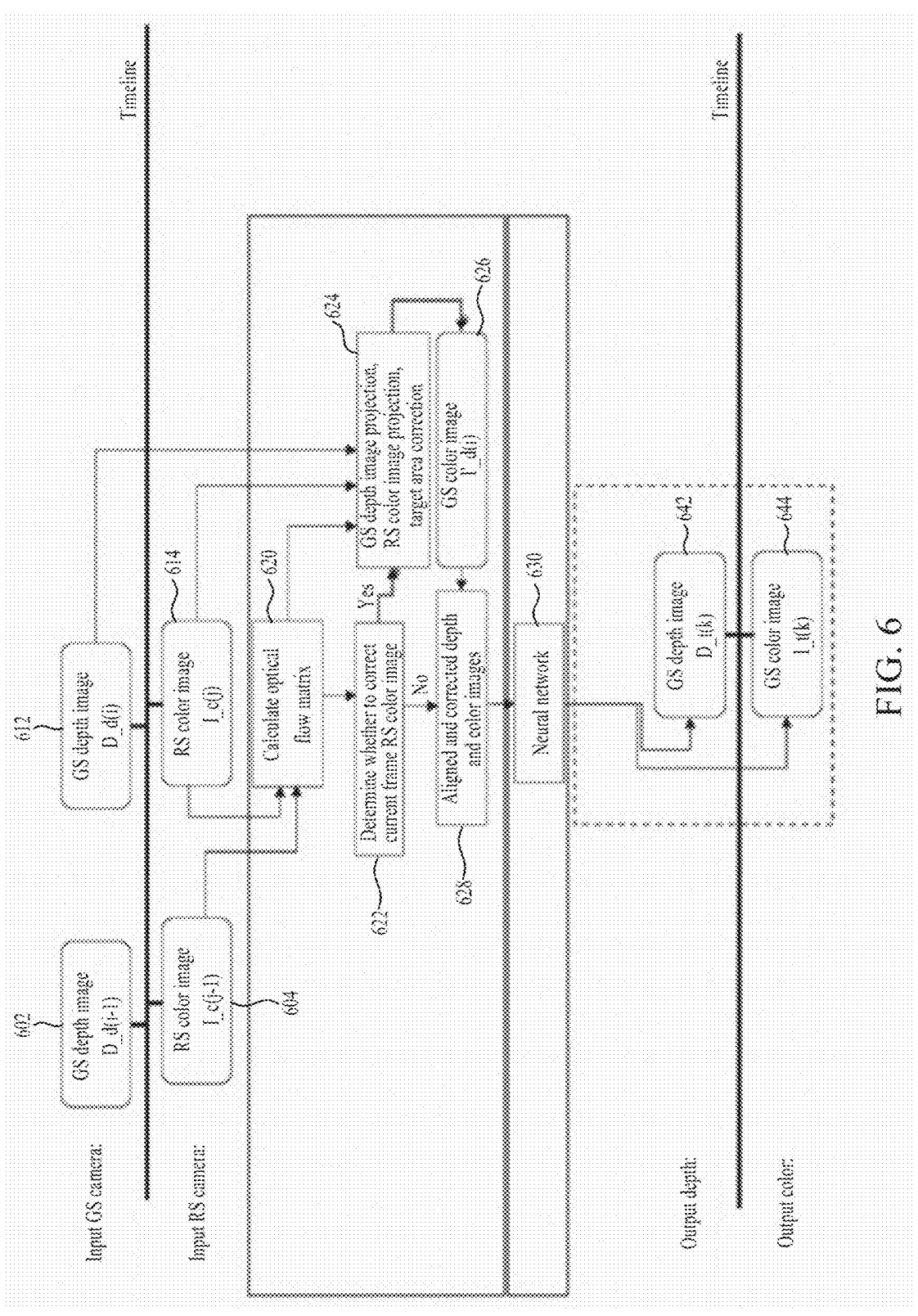
FIG. 6 illustrates an example of an image processing method.

FIG. 6 illustrates an example of an image processing method.

Referring to FIG. 6, in operation 620, the image processing method may calculate an optical flow matrix between an RS color image 604 and an RS color image 614 among a GS depth image 602 and the RS color image 604 received from a previous frame when a GS depth image 612 and the RS color image 614 are received in a current frame.

In addition, in operation 622, the image processing method may determine whether to correct the current frame RS color image.

As a result of the determination in operation 622, when correcting the RS color image, the image processing method may perform the above-described GS depth image projection, RS color image projection, and/or target area correction in operation 624 and generate a corrected GS color image I'_d (i) 626. In addition, in operation 628, the image processing method may provide the aligned GS depth image and the current frame GS color image to a neural network 630 and/or provide the aligned GS depth image and the corrected current frame GS color image to the neural network 630.

As a result of the determination in operation 622, when the RS color image is not corrected, in operation 628, the image processing method may align the GS depth image with the original RS color image I_c(i) and provide the aligned GS depth image and the current frame RS color image to a neural network.

In addition, the image processing method may output a GS depth image D_t(k) 642 and a GS color image I_t(k) 644 through a neural network.

Furthermore, referring to FIG. 2, it may be seen that some operations in FIG. 6 are unnecessary. For example, operations 622, 624, 626, and 628 in FIG. 6 may be partially or completely omitted by one of ordinary skill in the art depending on the actual situation.

The image processing may be in real-time. For example, the image processing method may be performed on each frame of an image. In addition, the image processing method may be performed periodically, for example, processing one image every 10 frames or processing one image every second, but examples are not limited thereto. One of ordinary skill in the art may set the period according to actual needs.

Figure 7:
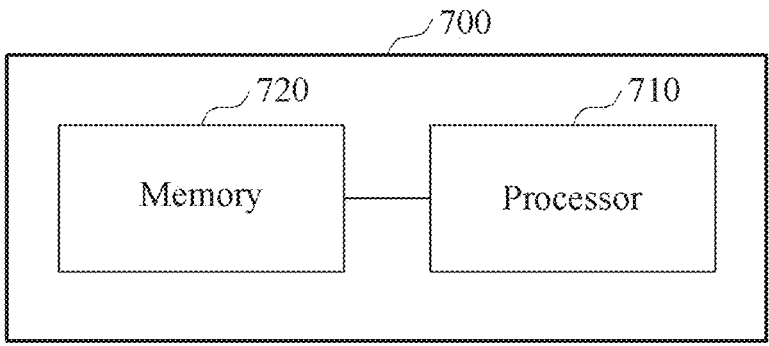
FIG. 7 illustrates an example of an electronic device that processes an image.

In addition, an electronic device may be provided as shown in FIG. 7 below.

FIG. 7 illustrates an example of an electronic device that processes an image.

Referring to FIG. 7, an electronic device 700 may include a memory 720 (e.g., one or more memories) and a processor 710 (e.g., one or more processors), in which the memory 720 may store computer-executable instructions. When the computer-executable instructions are executed by the processor 710, the processor 710 may execute the image processing method. For example, the memory 720 may be or include a non-transitory computer-readable storage medium storing instructions that, when executed by the processor 710, configure the processor 710 to perform any one, any combination, or all of the operations and methods described herein with reference to FIGS. 1-6.

A GS color image may be obtained using a motion matrix of a timestamp of a GS color image corresponding to a timestamp of a first scanline of an RS color image effectively, through which the image correction cost may be avoided in a real-time augmented reality (AR) application. In addition, by replacing a pixel in a target area based on optical flow, a robustness problem that damages a downstream task resulting from the assumption that an RS color image correction method is effective in the current method may be overcome. Additionally, the RS color image may be further improved through a neural network.

Through an artificial intelligence (AI) model, at least one module among a plurality of modules may be implemented. AI-related functions may be performed by a non-volatile memory, a volatile memory, and a processor.

For example, an electronic device may be a personal computer (PC), tablet device, personal digital assistant (PDA), smartphone, or other device capable of executing an instruction set. Here, the electronic device may not need to be a single electronic device and may be a device or assembly of circuits capable of executing the instructions (or the instruction set) individually or jointly. The electronic device may also be a part of an integrated control system or a system administrator, or may be configured as a portable electronic device that interfaces locally or remotely (e.g., via wireless transmission). The processor may include at least one processor. Here, at least one processor may be a general-purpose processor (e.g., a central processing unit (CPU) and an application processor (AP), etc.), or a graphics-dedicated processing unit (e.g., a graphics processing unit (GPU) and a vision processing unit (VPU)), and/or an AI-dedicated processor (e.g., a neural processing unit (NPU)). At least one processor may control processing of input data according to a predefined operation rule or an AI model stored in a non-volatile memory and a volatile memory. The predefined operation rule or the AI model may be provided through training or learning. Here, providing the predefined operation rule or the AI model through learning may indicate obtaining a predefined operation rule or AI model with desired characteristics by applying a learning algorithm to a plurality of pieces of learning data. This learning may be performed on a device itself in which AI is performed and/or may be implemented by a separate server/device/system.

The learning algorithm may be a method of training a predetermined target device, for example, a robot, based on a plurality of pieces of learning data and of enabling, allowing, or controlling the target device to perform determination or prediction. The learning algorithm may include, but is not limited to, for example, supervised learning, unsupervised learning, semi-supervised learning, or reinforcement learning.

The AI model may be obtained through training. Here, "being obtained through training" refers to training an AI model configured to execute a pre-defined operation rule or necessary feature (or a goal) by training a basic AI model with multiple pieces of training data through a training algorithm.

For example, an AI model may include a plurality of neural network layers. Each neural network layer has a plurality of weight values and the calculation of one neural network layer may be performed by a calculation result of a previous layer and a plurality of weights of a current layer. A neural network may include, for example, a CNN, a deep neural network (DNN), a recurrent neural network (RNN), a restricted Boltzmann machine (RBM), a deep belief network (DBN), a bidirectional recurrent deep neural network (BRDNN), a generative adversarial network (GAN), and a deep Q network but is not limited thereto.

The processor may execute instructions or code stored in the memory, which may further store data. Instructions and data may also be transmitted and received over a network via a network interface that may use an arbitrary known transport protocol.

For example, the memory may be integrated with the processor by arranging random-access memory (RAM) or flash memory in an integrated circuit microprocessor. The memory may also include an independent device such as an external disk drive, a storage array, or other storage devices that may be used in an arbitrary database system. The memory and the processor may be operatively coupled or communicate with each other through an input/output (I/O) port, network connections, etc., so the processor may read files stored in the memory.

In addition, the electronic device may further include a video display (e.g., a liquid crystal display (LCD)) and a user interaction interface (e.g., a keyboard, mouse, or touch input device). All components of the electronic device may be connected to each other through a bus and/or a network.

The XR systems, GS cameras, RS cameras, pre-processing modules, electronic devices, processors, memories, XR system 100, GS camera 110, RS camera 120, pre-processing module 520, electronic device 700, processor 710, memory 720, and other apparatuses, devices, units, modules, and components disclosed and described herein with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

obtaining a first motion matrix corresponding to an extended reality (XR) system and a second motion matrix based on a conversion coefficient from an XR system coordinate system into a rolling shutter (RS) camera coordinate system, the second motion matrix is a motion matrix of a timestamp of a depth image captured by a GS camera corresponding to a timestamp of a selected scanline among a plurality of scanlines of an RS color image captured by an RS camera, and the depth image is selected based on temporal correspondence with the selected scanline; and generating a GS color image of a current frame by projecting an RS color image of the current frame onto a global shutter (GS) color image coordinate system based on the second motion matrix.

2. The method of claim 1, further comprising:

determining whether to perform the obtaining of the second motion matrix based on motion information related to the RS camera, comprising determining angular velocity and positional velocity of the RS camera based on pose information of an XR system for the RS color image of the current frame and pose information of an XR system for an RS color image of a previous frame.

3. The method of claim 2, wherein the determining of whether to perform the obtaining of the second motion matrix based on the motion information related to the RS camera comprises performing either one of:

determining to perform the obtaining of the second motion matrix in response to either one or both of the angular velocity being greater than a first threshold and the positional velocity being greater than a second threshold; and determining a first optical flow matrix between the RS color image of the current frame and the RS color image of the previous frame in response to the angular velocity not being greater than the first threshold and the positional velocity not being greater than the second threshold, determining to perform the obtaining of the second motion matrix in response to a maximum value of the first optical flow matrix being greater than a third threshold, and determining not to perform the obtaining of the second motion matrix in response to the maximum value of the first optical flow matrix not being greater than the third threshold.

4. The method of claim 1, wherein the depth image captured by the GS camera corresponding to the timestamp of the selected scanline is a GS depth image with a timestamp closest to the timestamp of the selected scanline.

5. The method of claim 1, further comprising:

obtaining the first motion matrix and a third motion matrix based on the conversion coefficient from the XR system coordinate system into the RS camera coordinate system;

projecting a GS depth image corresponding to the selected scanline of the RS color image of the current frame onto the RS camera coordinate system using the third motion matrix based on the RS color image of the current frame and obtaining a GS depth image aligned with the RS color image of the current frame;

obtaining a depth feature by inputting the aligned GS depth image to a first neural network; and inputting the depth feature and the GS color image of the current frame to a second neural network and obtaining a corrected GS color image of the current frame, wherein the third motion matrix is a motion matrix for the timestamp of the first selected scanline.

6. The method of claim 1, further comprising:

determining a target area comprising a movable target in the GS color image of the current frame; and obtaining a corrected GS color image of the current frame by replacing a pixel of the target area of the GS color image of the current frame using a pixel corresponding to the target area in the RS color image of the current frame.

7. The method of claim 6, further comprising:

obtaining the first motion matrix and a third motion matrix based on the conversion coefficient from the XR system coordinate system into the RS camera coordinate system;

projecting a GS depth image corresponding to the selected scanline of the RS color image of the current frame onto the RS camera coordinate system using the third motion matrix based on the RS color image of the current frame and obtaining a GS depth image aligned with the RS color image of the current frame;

obtaining a depth feature by inputting the aligned GS depth image to a first neural network; and inputting the depth feature and the corrected GS color image of the current frame to a second neural network and obtaining an improved and corrected GS color image of the current frame, wherein the third motion matrix is a motion matrix for the timestamp of the selected scanline.

8. The method of claim 2, further comprising:

in response to determining not to perform the obtaining of the second motion matrix, obtaining the first motion matrix and a third motion matrix based on the conversion coefficient from the XR system coordinate system into the RS camera coordinate system;

projecting a GS depth image corresponding to the selected scanline of the RS color image of the current frame onto the RS camera coordinate system using the third motion matrix based on the RS color image of the current frame and obtaining a GS depth image aligned with the RS color image of the current frame;

obtaining a depth feature by inputting the aligned GS depth image to a first neural network; and inputting the depth feature and a RS color image of the current frame to a second neural network and obtaining the GS color image of the current frame, wherein the third motion matrix is a motion matrix for the timestamp of the selected scanline.

9. The method of claim 5, wherein the projecting of the GS depth image corresponding to the selected scanline of the RS color image of the current frame onto the RS camera coordinate system comprises:

projecting a plurality of second scanlines of the GS depth image corresponding to the selected scanline onto a GS camera coordinate system for the selected scanline of the RS color image of the current frame; and projecting the plurality of second scanlines onto the RS camera coordinate system based on the third motion matrix and obtaining a second scanline aligned with the first selected scanline.

10. The method of claim 9, wherein the plurality of second scanlines comprises a second scanline corresponding to the selected scanline of the RS color image of the current frame and a second scanline located in a predetermined range of the corresponding second scanline.

11. The method of claim 5, wherein the first neural network is a convolutional neural network (CNN) and/or the second neural network is a U-network (UNET) neural network.

12. The method of claim 1, wherein the projecting of the RS color image of the current frame onto the GS color image coordinate system comprises:

projecting the selected scanline onto a GS camera coordinate system for the selected scanline of the RS color image of the current frame; and projecting the first scanline onto the GS camera coordinate system and projecting the selected scanline onto the GS color image coordinate system based on the second motion matrix and obtaining the GS color image of the current frame.

13. The method of claim 6, wherein the determining of the target area comprising the movable target in the GS color image of the current frame comprises:

projecting a GS depth image corresponding to a selected scanline of the RS color image of the current frame onto the RS camera coordinate system based on an RS color image of a previous frame using a third motion matrix and obtaining a GS depth image aligned with the RS color image of the previous frame;

determining a second optical flow matrix based on a GS depth image aligned with the RS color image of the current frame and a GS depth image aligned with the RS color image of the previous frame; and determining the target area in the GS color image of the current frame based on a selected optical flow matrix and the second optical flow matrix between the RS color image of the current frame and the RS color image of the previous frame, wherein the third motion matrix is obtained based on the selected motion matrix and a conversion coefficient from the XR system coordinate system into the RS camera coordinate system, and wherein the GS depth image aligned with the RS color image of the current frame is obtained by projecting the GS depth image corresponding to the selected scanline of the RS color image of the current frame onto the RS camera coordinate system based on the RS color image of the current frame using the third motion matrix.

14. The method of claim 13, wherein the obtaining of the corrected GS color image of the current frame by replacing the pixel of the target area of the GS color image of the current frame using the pixel corresponding to the target area in the RS color image of the current frame comprises:

determining the pixel corresponding to the target area among the RS color image of the current frame and the GS color image of the current frame based on the selected optical flow matrix; and replacing the pixel of the target area of the GS color image of the current frame with the corresponding pixel.

15. An electronic device comprising:

one or more processors configured to:

obtain a first motion matrix corresponding to an extended reality (XR) system and a second motion matrix based on a conversion coefficient from an XR system coordinate system into a rolling shutter (RS) camera coordinate system, the second motion matrix is a motion matrix of a timestamp of a depth image captured by a GS camera corresponding to a timestamp of a selected scanline among a plurality of scanlines of an RS color image captured by an RS camera; and generate a GS color image of a current frame by projecting an RS color image of the current frame onto a global shutter (GS) color image coordinate system based on the second motion matrix.

16. The electronic device of claim 15, wherein the one or more processors are configured to:

determine whether to perform the obtaining of the second motion matrix based on motion information related to the RS camera, comprising determining angular velocity and positional velocity of the RS camera based on pose information of an XR system for the RS color image of the current frame and pose information of an XR system for an RS color image of a previous frame.

17. The electronic device of claim 16, wherein, for the determining of whether to perform the obtaining of the second motion matrix based on the motion information related to the RS camera, the one or more processors are configured to:

perform either one of:

determining to perform the obtaining of the second motion matrix in response to the angular velocity being greater than a first threshold or the positional velocity being greater than a second threshold; and determining a first optical flow matrix between the RS color image of the current frame and the RS color image of the previous frame in response to the angular velocity not being greater than the first threshold and the positional velocity not being greater than the second threshold, determine to perform the obtaining of the second motion matrix in response to a maximum value of the first optical flow matrix being greater than a third threshold, and determine not to perform the obtaining of the second motion matrix in response the maximum value of the first optical flow matrix not being greater than the third threshold.

18. The electronic device of claim 15, wherein the depth image captured by the GS camera corresponding to the timestamp of the selected scanline is a GS depth image with a timestamp closest to the timestamp of the selected scanline.

19. The electronic device of claim 15, wherein the one or more processors are configured to:

obtain the first motion matrix and a third motion matrix based on the conversion coefficient from the XR system coordinate system into the RS camera coordinate system;

project a GS depth image corresponding to a selected scanline of the RS color image of the current frame onto the RS camera coordinate system using the third motion matrix based on the RS color image of the current frame and obtain a GS depth image aligned with the RS color image of the current frame;

input the aligned GS depth image to a first neural network and obtain a depth feature; and input the depth feature and the GS color image of the current frame to a second neural network and obtain a corrected GS color image of the current frame, wherein the third motion matrix is a motion matrix for the timestamp of the selected scanline.

20. The electronic device of claim 15, wherein the one or more processors are configured to:

determine a target area comprising a movable target in the GS color image of the current frame; and obtain a corrected GS color image of the current frame by replacing a pixel of the target area of the GS color image of the current frame using a pixel corresponding to the target area in the RS color image of the current frame.

* * * * *